US009686091B2

(12) United States Patent
Pearson et al.

(10) Patent No.: US 9,686,091 B2
(45) Date of Patent: Jun. 20, 2017

(54) NETWORK ADDRESS MANAGEMENT AND FUNCTIONAL OBJECT DISCOVERY SYSTEM

(71) Applicant: Harman International Industries, Incorporated, Northridge, CA (US)

(72) Inventors: Levi Pearson, Lehi, UT (US); David Olsen, Kaysville, UT (US); Craig Gunther, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 261 days.

(21) Appl. No.: 13/757,401

(22) Filed: Feb. 1, 2013

(65) Prior Publication Data

US 2014/0222987 A1   Aug. 7, 2014

(51) Int. Cl.
G06F 15/173 (2006.01)
H04L 12/24 (2006.01)
H04L 29/12 (2006.01)
H04N 21/414 (2011.01)

(52) U.S. Cl.
CPC ...... *H04L 12/2409* (2013.01); *H04L 61/1511* (2013.01); *H04L 61/2015* (2013.01); *H04L 61/35* (2013.01); *H04N 21/41422* (2013.01)

(58) Field of Classification Search
CPC .................................................. G06F 17/30879
USPC ........................................ 709/203, 220-224
See application file for complete search history.

(56) References Cited

U.S. PATENT DOCUMENTS 5,291,593 A * 3/1994 Abraham et al. ............. 707/740
6,195,706 B1 * 2/2001 Scott ............................ 709/245
7,039,688 B2 * 5/2006 Matsuda et al. .............. 709/220
8,161,146 B2 * 4/2012 Baldiga et al. ............... 709/223
8,656,026 B1 * 2/2014 Prasad et al. ................. 709/227
8,693,482 B2 * 4/2014 Ozugur et al. ............... 370/401
2005/0033833 A1 * 2/2005 Baldiga et al. ............... 709/222
2005/0044265 A1   2/2005 Vinel et al.
2008/0049779 A1 * 2/2008 Hopmann et al. ........... 370/431

(Continued)

FOREIGN PATENT DOCUMENTS

WO   2009146465 A2   12/2009

OTHER PUBLICATIONS

MOST Corporation, Media Oriented System Transport Specification, Oct. 2006, Rev. 2.5.*

(Continued)

*Primary Examiner* — Umar Cheema
*Assistant Examiner* — Anthony Rotolo
(74) *Attorney, Agent, or Firm* — McCoy Russell LLP (57) ABSTRACT

A network communication system includes a network address management and functional object discovery system. The network address management and functional object discovery system includes a network manager that manages network addresses for functional objects of electronic devices that communicate with each other over a network. The network manager may maintain a database that maps or associates unique IDs of the functional objects with associated network addresses. The network manager may provide non-conflicting instance IDs and network addresses to the electronic devices. The network manager may also provide instance IDs and/or network addresses for other electronic devices so that the electronic devices may communicate with each other over the network.

20 Claims, 6 Drawing Sheets

(56) References Cited

U.S. PATENT DOCUMENTS

2008/0159304 A1* 7/2008 Ozugur et al. ............... 370/401
2010/0318917 A1* 12/2010 Holladay ......... H04N 21/43615
715/735
2011/0107224 A1 5/2011 Zeuthen

OTHER PUBLICATIONS

Yan, Renxiang et al., "DNS Zone Suffix Option for DHCPv6; <Draft-yan-dhc-dhcpv6-opt-dnszone-01.txt>", Oct. 12, 2004, Internet Engineering Task Force, 6 pages.
European Patent Office, Extended European Search Report of EP14151069.3, Germany, Jul. 16, 2014, 7 pages.
"BOOTP/DHCP options" at http://www.networksorcery.com/enp/protocol/bootp/options.htm, 6 pages, Sep. 23, 2008.

* cited by examiner

NETWORK ADDRESS MANAGEMENT AND FUNCTIONAL OBJECT DISCOVERY SYSTEM

BACKGROUND OF THE INVENTION

1. Technical Field

This invention relates to network communication, and more particularly to managing network addresses and functional object identification information for network devices that communicate in a network communication system.

2. Related Art

Electronic devices that are part of a network communication system may be configured to perform various functions or services in the system. These electronic devices may want to communicate with each other over a network to have the various functions or services performed. To enable communication over the network, the network communication system may use network addressing techniques to assign network addresses for the electronic devices connected in the system.

SUMMARY

A network communication system may include a network address management and functional object discovery system. The network address management and functional object discovery system may include a network manager that manages network address information and identification information for electronic devices that connect to and disconnect from the network communication system. Each of the electronic devices may include one or more functional objects that perform functions or services in the system. The electronic devices may wish to communicate with each other based on the functions or services that their functional objects are configured to perform. The network manager may maintain and/or manage a database of the network address and identification information for the functional objects in the system so that the electronic devices may communicate with each other.

The network manager may maintain the database by adding functional object and network address information to the database for electronic devices that have connected to the system. An electronic device may connect to the system during a boot up process. When booting up, the electronic device may transmit a request message in a predetermined protocol, such as a Dynamic Host Configuration Protocol (DHCP) request message, to request identification and network address information for its functional objects. The request for the identification information may include a request for instance IDs. Each functional object may belong to a class of functions, identified by a class ID. The instance ID may instantiate the functional object in the class, and the combination of the instance ID and the class ID may provide a unique ID for the functional object in the system.

Upon receipt of the request message, the network manager may obtain instance IDs and one or more network addresses for the functional objects identified in the request message, and include them as part of a response message provided in a predetermined protocol, such as a DHCP response message, that the network manager transmits to the electronic device. The network manager may also update the database to include the unique IDs identifying the functional objects and the network addresses that are associated with unique IDs.

Additionally, the network manager may detect that an electronic device has disconnected from the system. Upon detection, the network manager may remove functional object information, including unique IDs and network addresses for functional objects that are associated with the disconnecting electronic device.

An electronic device connected in the system may want to communicate with another electronic device in the system. To do so, the electronic device may need identification information and/or network address information for the other electronic device. To obtain the information, the electronic device may send an information request message, such as a Domain Name System (DNS) request message, to the network manager. The information request message may include a unique ID of a functional object that the electronic devices wants to communicate with, and the information request may be a request for a network address associated with the unique ID. Upon receipt of the information request, the network manager may access the database and obtain the network address associated with the unique ID included in the information request.

Alternatively, the electronic device may not know the unique ID of the functional object, but may have identified a class of functional objects that it wants to communicate with. The electronic device may send a DNS request to query the network manager for any or all functional objects that belong to the identified class. The network manager may access the database and obtain unique IDs and associated network addresses for any or all functional objects belonging to the class identified in information request message.

Through management and maintenance of the database, the network manager may ensure that identification information and network address information for functional objects in the system do not conflict. Additionally, the network manager may enable devices that operate or function using functional objects, such as Media Oriented Systems Transport (MOST) devices, to communicate over a communication network that requires network addresses, such as Audio-Video Bridging (AVB) networks.

Other systems, method, features and advantages will be, or will become, apparent to one with skill in the art upon examination of the following figures and detailed description. It is intended that all such additional systems, method, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The present description describes a network communication system that includes a network address management and functional object discovery system. The network address management and functional object discovery system manages network addressing for functional objects. The network communication system may include a plurality of electronic devices that communicate with each other over a network. Each of the electronic devices may include one or more functional objects, where each functional object may perform a function in the system. Each functional object may have a unique identification (ID) in the system. To communicate over the network, the electronic devices and/or the functional objects may use network addresses. The network address management and functional object discovery system may include a network manager that manages the network addresses and the unique IDs of the functional objects so that the electronic devices may communicate with each other over the network.

Figure 1:
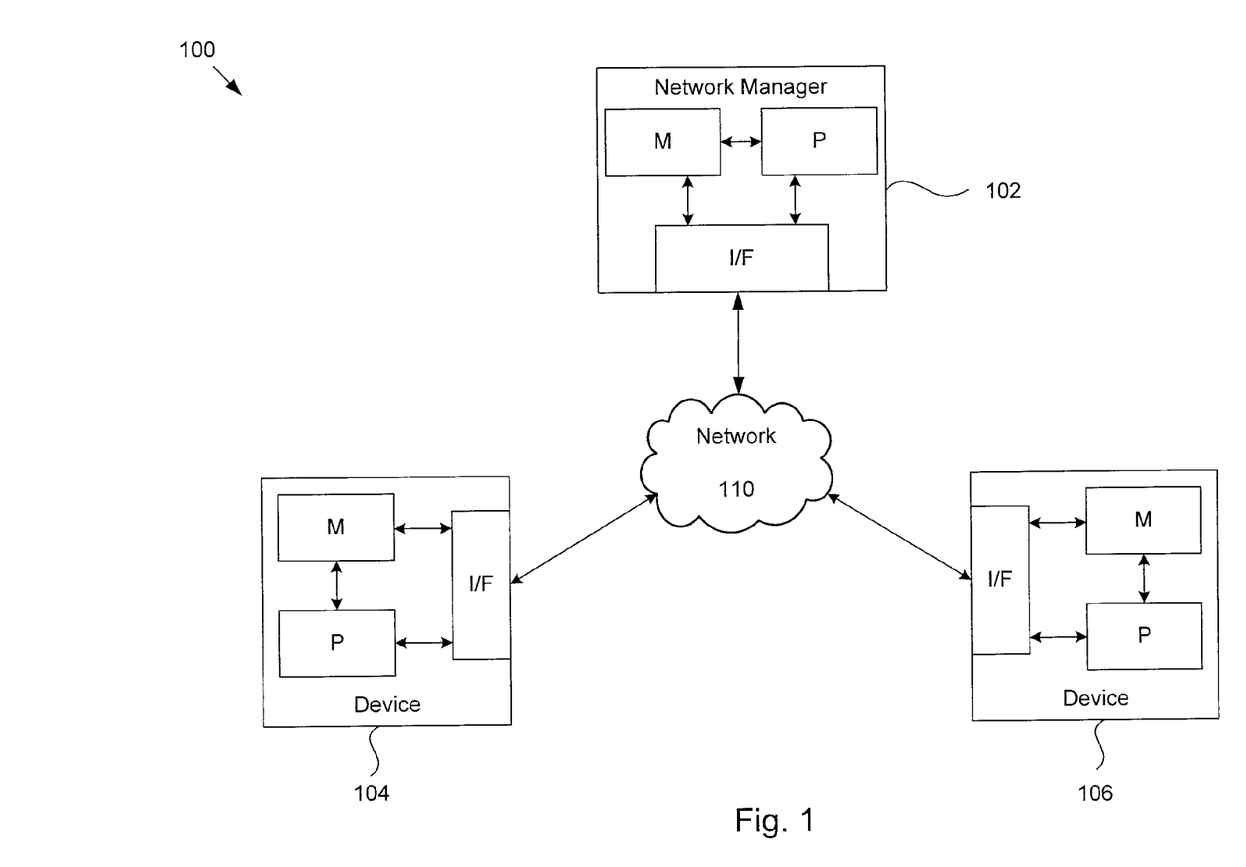
FIG. 1 is a block diagram of an example network communication system that includes a network address management and functional object discovery system.

FIG. 1 shows a block diagram of an example network communication system 100 that may include a plurality of electronic devices 102, 104, 106 configured to communicate with each other over a network 110. FIG. 1 shows three electronic devices 102, 104, 106, although more or fewer than three devices may be included in the system 100. One of the devices 102 may be configured to function as a network manager. The network manager 102 may be configured to perform various tasks or have various responsibilities, such as tracking functional objects in the system 100, assigning unique IDs and/or network addresses to the functional objects, ensuring that the unique IDs do not conflict, and/or maintaining a list or database that associates or maps network addresses and unique IDs for the functional objects. The network manager 102 may have other tasks or responsibilities, as described in more detail below.

The other electronic devices 104, 106 (hereinafter referred to as the first device 104 and the second device 106) may be configured to perform one or more functions other than the function of the network manager. (The network manager 102 may also be configured to perform one or more functions other than that of the network manager. For simplicity, however, the other functions are referred to as being performed by the first and second devices 104, 106.) All or some of the other functions may be associated with and/or specific to the network communication system 100 or an environment in which the network communication system 100 is implemented. As an example, the network communication system 100 may be implemented as a vehicle network communication system in an automotive environment, such as a vehicle. The vehicle network communication system 100 may be configured to communicate information associated with various systems in the automotive environment, such as an audio system, a video system, a navigation system, an alarm system, a temperature control system, a braking system, and/or a lighting system, as examples. The first and second devices 104, 106 may be devices for one or more of these systems. For example, one of the devices 104, 106 may be a head unit that includes control interfaces for a compact disc (CD) player, a radio, and a digital versatile disc (DVD) player of an audio/video (A/V) system.

The network manager function of the network manager 102 and/or the other functions of the first and second devices 104, 106 may be associated or classified in accordance with functional objects, which may include the hardware, software, or combinations of the hardware and software used to perform the function. Thus, a device may include one or more functions, and one or more corresponding functional objects. In some examples, the functional objects may include the application software that performs at least some of the function. The functional objects may be associated with a class. Functional objects belonging to the same class may perform the same function. For example, a class identified as a CD player class may include functional objects that perform CD playback. If both device 104 and device 106 are CD players, then the first and second devices 104, 106 may each include functional objects that are part of the CD player class.

Each class may have an associated class ID. In addition, each functional object that is part of a class may be identified, in part, by the class ID. For example, if the first device 104 and the second device 106 each include CD player functional objects, then the CD player functional objects may each be identified in part by the CD player class ID.

To differentiate between functional objects having the same class ID, each functional object may be further identified by an instance ID that may instantiate functional objects that belong to the same class. The instance IDs may include numerical identifiers, such as one, two, three, etc., as an example. Other types of identifiers may be used. No two functional objects of the same class may have the same instance ID. In this way, a combination of the class ID and the instance ID may uniquely identify every functional object in the system 100.

In some example configurations, the functional objects of the devices 104, 106 may be implemented in accordance with Media Oriented Systems Transport (MOST) communication specifications to communicate in a MOST network. In general, devices connected in a MOST network may communicate with each other using a MOST vehicle bus standard, which may use time division multiplexing as an underlying transport mechanism to communicate A/V data. The MOST network may be implemented using fiber optic cables. Additionally, the devices in the MOST network may identify and/or communicate with each other in accordance with a ring topology.

Where the functional objects of the devices 104, 106 are implemented in accordance with MOST, the functional objects may be referred to as functional blocks or FBlocks. The FBlocks may be implemented in an application layer of the devices 104, 106. The FBlocks may communicate FBlock messages using an FBlock interface. The FBlock may communicate via the FBlock interface with other applications in the same or different layers within the devices 104, 106 to send, receive, generate, and/or process the FBlock messages.

The class ID for a FBlock may be referred to as a FBlock ID. Each FBlock may be uniquely identified in a MOST network by a FBlock ID and an instance ID.

The network 110 of the network communication system 100 may be a network other than a MOST network. For example, the network 110 may be an Ethernet network, or configured for Ethernet communication. In one particular example, the network 110 may include an Ethernet Audio-Video Bridging (AVB) network. The devices 102, 104, 106 (or one or more bridges in the network 110) may communicate using various Ethernet AVB protocols, such as the Institute of Electrical and Electronics Engineers (IEEE) 802.1AS-2011 (gPTP) for network timing and synchronization, IEEE 802.1Qav-2009 for queuing and forwarding streaming data, IEEE 802.1Qat-2010 (Stream Reservation Protocol (SRP)) for reserving data stream bandwidth in a network, and/or IEEE 1722-2011 related to a possible data streaming format. In some example configurations, each of the MOST network and network 110 may be vehicle networks and/or networks that may be implemented within a vehicle or automotive environment.

In addition or alternatively, the network 110 may be configured to communicate information as streams of data frames and/or packets. The information may be packetized in any packet format and/or in accordance with any standard or protocol, such as Transmission Control Protocol (TCP), User Datagram Protocol (UDP), and/or the AVB protocols. In addition, the information may be communicated over the network 110 in accordance with any of the various layers or using any network addressing techniques associated with the various layers (including Layers 2 and 3) of the Open Systems Interconnection (OSI) model.

In the example network communication system 100, one or more functional objects (such as FBlocks) of the first and second devices 104, 106 may wish to communicate information—such as data (e.g., A/V data) or control information to control the flow of the data—to each other over the network 110. For example, a first functional object of the first device 104 may wish to send data to a second functional object of the second device 106 over the network 110. To do so, the first device 104 and/or the first functional object may need to know various identification information that identifies the second device 106 and/or the second functional object, including the class ID and/or the instance ID of the second functional object, and a network address associated with the second functional object (i.e., a destination network address). The first device 104 and/or the functional object of the first device 104 may also need to know various identification information that identifies the first device 104 and/or the first functional object, including the class ID and the instance ID of the first functional object, and a network address associated with the first functional object (i.e., a source network address).

In some example configurations, the network address, including the source network address and the destination address, may be a Layer 3 network address or an Internet Protocol (IP) address. Additionally, the network address may be specific on a device level and generic on a functional object level. That is, the network address may be an address for the electronic device, and each functional object of the electronic device may have the same network address. Alternatively, the network address may be unique or different for each functional object of an electronic device.

The network manager 102 may manage the network addresses and the unique IDs associated with the functional objects so that the functional objects may obtain their own identification information and/or network address information, as well as identification and/or network address information of other functional objects in order to communicate information over the network 110.

The electronic devices 104, 106 may be configured to transmit information requests or information request messages to the network manager 102 to obtain instance IDs and/or network addresses for their respective functional objects. These information requests may be transmitted in accordance with a predetermined standard or protocol, such as Dynamic Host Configuration Protocol (DHCP), although one or more other protocols may be used. The electronic devices 104, 106 may be configured to transmit other information request messages to the network manager 102 to obtain instance IDs and/or network addresses for functional objects of other devices in the system 100 so that their functional objects may communicate information with the functional objects of other electronic devices. These other information requests may be transmitted in accordance with a naming scheme, such as Domain Name System (DNS), although other types of naming schemes may be used. Hereafter, for clarity, information requests transmitted by an electronic device for identification information and network address information for its own functional objects are referred to as DHCP requests and responses to the DHCP requests are referred to as DHCP responses. Information requests transmitted by an electronic device to obtain identification information and network address information for functional objects other than its own are referred to as DNS requests, and responses to the DNS requests are referred to as DNS responses. However, as described, protocols, standards, and/or naming schemes other than DHCP and/or DNS may alternatively be used.

In some example configurations, the electronic devices 104, 106 may also be configured to transmit discovery messages in the form of broadcast messages over the network 110 to obtain a network address of the network manager 102 or otherwise discover the network manager 102. The discovery messages may be transmitted in accordance with a predetermined standard or protocol, such as Dynamic Host Configuration Protocol (DHCP), although one or more other protocols may be used.

The electronic devices 104, 106 may transmit the DHCP requests and/or the discovery messages during boot up processes of the devices 104, 106. Additionally, the electronic devices 104, 106 may transmit the discovery messages prior to transmission of the DHCP messages where the electronic devices 104, 106 do not previously know the network address of the network manager 104, 106. Alternatively, if the electronic devices 104, 106 already know the network address of the network manager 102, but do not know the instance IDs and/or the network addresses for their functional objects, then the electronic devices 104, 106 may transmit the DHCP messages without first transmitting the discovery messages.

Figure 2:
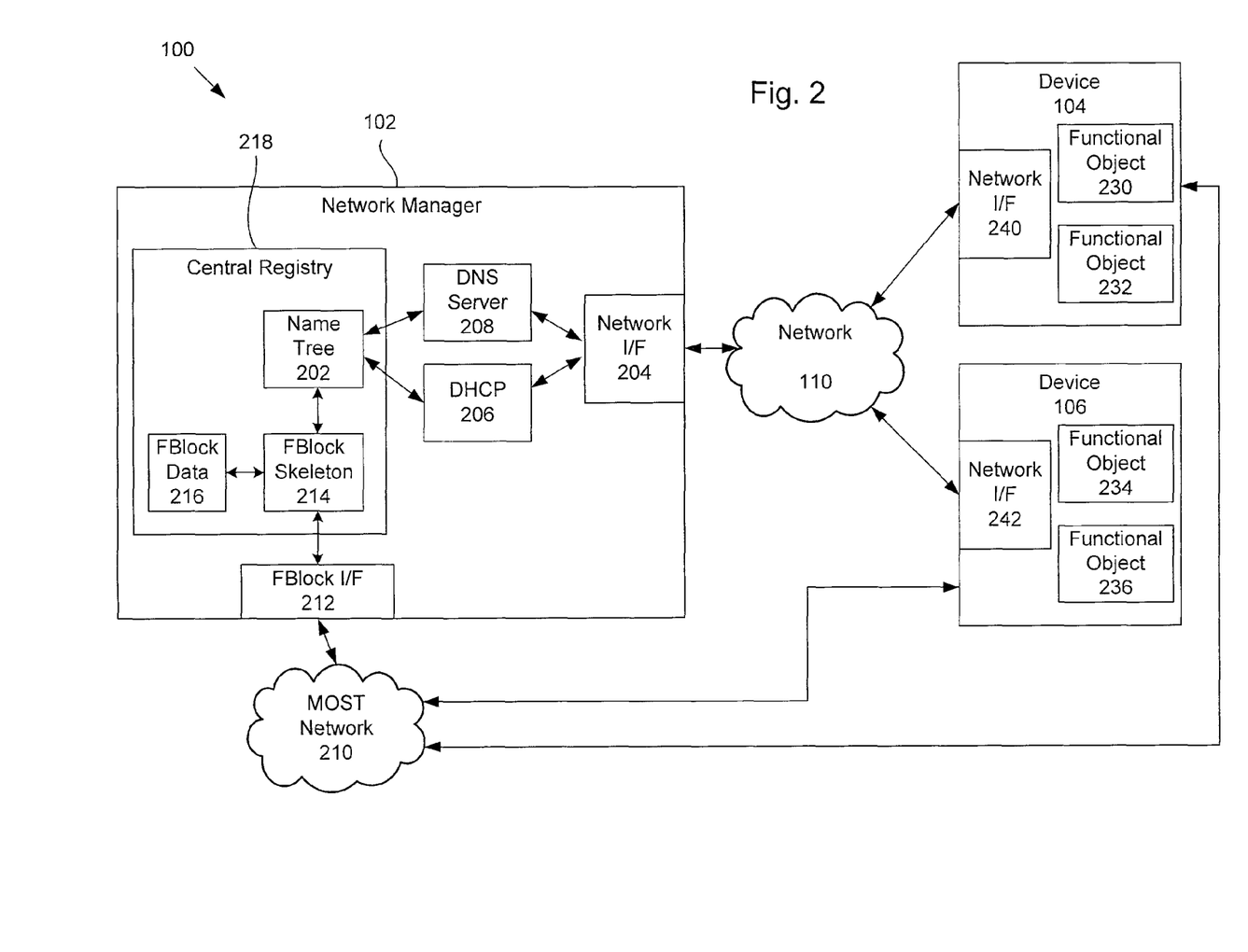
FIG. 2 is a block diagram of the network communication system shown in FIG. 1, illustrating various modules of the components of the devices in the network address management and functional object discovery system.

FIG. 2 shows a block diagram of the network communication system 100, illustrating various modules of the network manager 102 and the first and second devices 104, 106. The network manager 102 may include a name tree module 202 that may maintain a database or listing of functional objects and associated network addresses. A functional object may be identified by the name tree module 202 by a unique ID that uniquely identifies the functional object in the system 100. The unique ID may include a combination of a class ID and an instance ID. Alternatively, the unique ID may include a name, such as a Domain Name System (DNS) translation, that may be derived or converted from and/or associated with the combination of the class ID and the instance ID. Each unique ID of a functional object included in the database of the name tree module 202 may be associated with a network address. In addition or alternatively, each unique ID may be associated with a resource record from the network address may be extracted. The name tree module 202 may map or provide a mapping of the unique IDs of the functional objects and associated network addresses and/or resource records.

In some example configurations, the name tree module 202 may also include a unique ID and an associated network address of the network manager 102. The network address of the network manager 102 may be a static network address. Upon receipt of a request for the unique ID and/or the network address of the network manager 102 from the electronic devices 104, 106, the network manager 102 may be configured to access the name tree module 202 to obtain its unique ID and/or network address.

The name tree module 202 may be populated through detection and/or identification of functional objects as electronic devices connect to the network communication system. In some example configurations, the detection and/or identification may occur through receipt of DHCP requests from electronic devices. The DHCP requests may be requests for instance IDs and/or network addresses for the functional objects of the electronic devices. The electronic devices may be configured to transmit the DHCP requests during or in response to a boot up process.

To illustrate, four functional objects 230, 232, 234, 236 may be in the network communication system 100. As shown in FIG. 2, a first functional object 230 and a second functional object 232 may be components of the first electronic device 104, and a third functional object 234 and a fourth functional object 236 may be components of the second electronic device 106. The first and second electronic devices 104, 106 may each be configured to undergo a boot up process, which may be part of an initial activation or start up period of an operating system of the first electronic device 104. In addition or alternatively, the boot up process may be part of an initial connectivity process to connect to the network 110. One or more boot up scripts may be generated or activated, which may control the boot up process.

During or in response to the boot up process, the first electronic device 104 may be configured to generate a DHCP request, which may be a request for instance IDs and/or network addresses for the first and second functional objects 230, 232. The DHCP request may include information identifying the first and second functional objects 230, 232, such as the class IDs of the classes to which the first and second functional objects 230, 232 belong. The first electronic device 104 may be configured to transmit the DHCP request with a network interface (I/F) module 240 over the network 110 to the network manager 102.

Similarly, during or in response to a boot up process of the second electronic device 106, the second electronic device 106 may be configured to generate a DHCP request. The DHCP request may include information identifying the third and fourth functional objects 234, 236, such as the class IDs of the classes to which the third and fourth functional objects 234, 236 belong. The second electronic device 106 may be configured to transmit the DHCP request with a network interface (I/F) module 242 over the network 110 to the network manager 102.

The network manager 102 may be configured to receive the DHCP requests with a network interface module 204 in communication with the network 110. The network manager 102 may include a DHCP module 206 that may be configured to obtain and/or assign instance IDs and/or network addresses for the functional objects identified in the DHCP requests. To obtain and/or assign the instance IDs, the DHCP module 206 may communicate with and/or access information included in the name tree module 202. Based on information included in and/or provided by the name tree module 202, the DHCP module 206 may determine the instance IDs for the class IDs included in the DHCP requests. For a given class ID included in a DHCP request, if the name tree module 202 does not identify other functional objects with the same class ID, then the DHCP module 206 may be configured to assign an initial instance ID, such as "1", for that class ID. Alternatively, if the name tree module 202 identifies one or more functional objects with the same class ID, then the DHCP module 206 may be configured to identify the instance IDs associated with those functional objects in the name tree module 202, and assign an instance ID for the functional object identified in the DHCP request that is different from instance IDs identified with the name tree module 202. In some example configurations, the assignment of the instance ID may be based on an order, such as a sequential order.

To illustrate, if the first functional object 230 of the first electronic device 104 is a CD player functional object, the DHCP request transmitted by the first electronic device 104 may include a CD player class ID. Upon receipt of the DHCP request, the DHCP module 206 may communicate with the name tree module 202 to determine if there are other functional objects belonging to the CD player class connected in the system 100. If there is not, then the DHCP module 206 may assign an initial instance ID, such as "1", to the functional object identified in the DHCP request. Alternatively, if there are one or more functional objects belonging to the CD player class, then the DHCP module 206 may identify the instance IDs of those CD player functional objects, and assign an instance ID that is different than the instance IDs for those CD player functional objects. For example, upon receipt of the DHCP request, if there is a CD player functional object already identified with an instance ID of "1", then the DHCP module 202 may be assign an instance ID of "2" for the CD player functional object 230 of the first electronic device 104.

Additionally, the DHCP module 206 may be configured to assign network addresses for the functional objects identified by the class IDs included in the DHCP requests. The DHCP module 206 may be configured to determine the network addresses using and/or in accordance with DHCP, although other network protocols may be used. In addition or alternatively, the DHCP module 206 may be configured to function as a DHCP server and maintain a database of available network addresses. The DHCP module 206 may be configured to select network addresses for the functional objects identified in the DHCP requests based on available network addresses identified in the database. Alternatively, the DHCP module 206 may communicate with a DHCP server, which may be external to the network manager 102. The DHCP module 206 may communicate with the external DHCP server over the network 110 to obtain the network addresses.

After the DHCP module 206 obtains and/or assigns instance IDs and network addresses for the functional objects identified in the DHCP request, the DHCP module may be configured to generate a DHCP response that includes the assigned instance IDs and the network addresses. The DHCP response may further include resource records from which the network addresses may be extracted. The network manager 102 may transmit the DHCP response with the interface module 204 over the network 110 to the electronic device 104 or 106 that transmitted the DHCP request. Upon receipt of the DHCP response, the electronic device 104 or 106 may know the instance IDs and/or the network addresses for its functional objects.

In addition to providing the instance IDs and/or the network addresses to the electronic devices 104, 106, the network manager 102 may continually update and/or modify the database maintained by the name tree module 202. Once the instance IDs and/or the network addresses for the functional objects identified in the DHCP request are determined by the DHCP module 206, the DHCP module 206 may communicate with the name tree module 202 so that the class IDs and the instance IDs for the functional objects, along with the associated network addresses, are added to the database. In this way, the database may be continually populated as electronic devices connect to the system 100 and communicate DHCP requests to the network manager 102.

The network manager 102 may also continually update and/or modify the database by removing unique IDs (i.e., class IDs and instance IDs) and associated network addresses of functional objects for electronic devices that are disconnecting or are no longer connected in the network communication system 100. In some example configurations, the network manager 102 may receive a disconnect message from an electronic device wishing to disconnect from the network 110. The disconnect message may include the information identifying the functional objects (e.g., the class IDs and the instance IDs) along with the associated network addresses. Based on receipt of the disconnect message, the name tree module 202 may remove the functional objects and associated network addresses from the database.

In some example configurations, the network manager 102 may be configured to detect electronic devices that may have connected to and/or disconnected from the network 110 by periodically transmitting multicast or broadcast requests over the network 110, which may request that electronic devices in the system 100 send responses that identify their functional objects. In some configurations, the network manager 102 may transmit the request as a multicast message rather than a broadcast message where transmission of a broadcast message would be transmitted to devices outside of or not connected to the system 100. For these configurations, the network manager 102 may transmit the request message as a multicast message so that only devices in the system 100 receive the request. In alternative configurations, the request may be transmitted as a broadcast message. In response to the multicast or broadcast messages, the electronic devices may send a message to the network manager 102 that includes information identifying the functional objects. If an electronic device previously registered its functional objects, such as by previously sending a DHCP request to the network manager 102, the electronic device may include the unique IDs (including the class IDs and the instance IDs) for the functional objects and the associated network addresses. Alternatively, if the electronic device did not previously register its functional objects, the electronic device may be configured to respond to the multicast or broadcast message by sending a DHCP request that requests instance IDs and network addresses for its functional objects.

Based on receipt of the responses to the multicast or broadcast messages from the electronic devices, the name tree module 202 may update the database. For example, the name tree module 202 may perform a comparison of the information included in the responses with the information included in the database. If the responses provide information that was not already included in the database, then the name tree module 202 may add the information in the responses to the database. Alternatively, if the database includes information identifying functional objects, but those functional objects are not identified in the responses to the broadcast messages, then the network manager 102 may determine that the electronic devices having those functional objects are no longer connected to the network 110, and the name tree module 202 may remove those functional objects from the database.

In some example configurations, the network manager 102 may transmit the multicast or broadcast messages in conjunction with a priority or an interrupt scheme. For example, during an initial start up of the system 100, several electronic devices may boot up at or around the same time. As a result, the network manager 102 may receive DHCP requests at or around the same time. In some situations, the network manager 102 may not be able to process all of the DHCP requests as they are received. To handle the DHCP requests, the network manager 102 may assign a priority to the DHCP requests based on the class IDs included in the DHCP requests. Those DHCP requests with a higher priority may be processed first, while those DHCP requests with a lower priority may be placed in a queue, or may be discarded altogether. To ensure that all DHCP requests (i.e., both the higher and lower priority DHCP requests) are handled and all functional objects are registered in the database, the network manager 102 may transmit a broadcast message after it processes the higher priority DHCP requests.

As previously described, the electronic devices 104, 106 may be configured to transmit discovery messages over the network 110 before transmission of the DHCP messages to discover the network address and/or the unique ID of the network manager 102 if the electronic devices 104, 106 do not know the network address of the network manager 102. Upon receipt of the broadcast message, the DHCP module 206 may communicate with the name tree module 202 to obtain the network address of the network manager 102. In some example configurations, the network manager 102 may be a functional object of the system 100 and have its own unique ID, including a class ID and an instance ID. The network address of the network manager may be included in the database of the name tree module 202 as being associated with the unique ID of the network manager 102. In response to the broadcast messages received from the electronic devices 104, 106, the network manager 102 may transmit a response that includes the network address and/or the unique ID of the network manager 102 over the network 110 to the electronic devices 104, 106. Once the electronic devices 104, 106 know the network address and/or the unique ID of the network manager 102, the electronic device 104, 106 may transmit the DHCP requests to the network manager 102. The DHCP requests may be transmitted as unicast messages to the network manager 102, rather than as a broadcast messages, because the electronic devices 104, 106 now know the network address of the network manager 102.

The network manager 102, through the use of the name tree module 202 and the DHCP module 206, may ensure there are no naming or network address assignment conflicts among the various functional objects in the system 100. That is, the name tree module 202 may continually update its database and the DHCP module 206 may assign instance IDs and network addresses by analyzing the name tree module's database and the DHCP server database so that no two functional objects in the system 100 have the same unique ID (i.e., the same combination of class IDs and instance ID) and the same network address. In some example configurations, the name tree module's database and the DHCP server database are part of the same database. In alternative configurations, the name tree module's database and the DHCP server data are separate and/or distinct databases. Various configurations are possible.

In some example configurations, an electronic device previously connected in the system 100, may have an instance ID and/or a network address from the previous connection. For these configurations, the electronic device, upon reconnecting with the system 100, may transmit a DHCP request that includes the instance IDs and the network addresses associated with the functional objects from the previous connection. In this way, the DHCP request may not be a request for instance IDs and/or network addresses, but instead may be a re-registration request to request that the network manager 102 re-register its functional objects in the database.

In response to the re-registration request, the DHCP module 206 may determine whether the instance IDs and/or the network addresses identified in the re-registration request were assigned to another functional object while the electronic device was disconnected to the network 110 so that there are no conflicts. If the DHCP module 206 determines that the instance ID and/or the network address was reassigned to another functional object, then the DHCP module 206 may assign a new instance ID and/or network address for the re-registering functional object. The DHCP module 206 may then transmit a DHCP response with the new instance ID and/or network address to the electronic device that transmitted the re-registration request. Alternatively, if the DHCP module 206 determines that the instance ID and/or the network address were not reassigned, then the DHCP module 206 may determine to keep the instance ID and/or network address from the previous connection for the functional object. The DHCP module 206 may then transmit an acknowledgement message to the electronic device that transmitted the re-registration request. The name tree module 202 may update the database with the new or prior instance ID and/or network address, depending on the determination.

As previously described, a functional object of one electronic device (i.e., a source functional object) may wish to transmit information, such as data or control information, over the network 110 to a functional object of another electronic device (i.e., a destination functional object). To transmit the information, the source functional object may need the unique ID and/or the network address of the destination functional object. To obtain the unique ID and/or the network address of the destination functional object, the source functional object may transmit a Domain Name System (DNS) request to the network manager 102.

The network manager 102 may include a DNS module 208 to obtain and provide an instance ID and/or a network address of a destination functional object to the source functional object. The network manager 102 may receive the DNS request with the network interface module 204. Upon receipt of the DNS request, the DNS module 208 may be configured to communicate with the name tree module 202 to obtain the requested information. In some situations, the source functional object may know the unique ID of the destination functional object, which may include both the class ID and the instance ID or alternatively a name, such as a DNS name, derived from the class ID and the instance ID. However, the source functional object may not know the network address of the destination functional object. For these situations, the DNS request may be a request for the network address of the destination functional object associated with the unique ID.

Upon receipt of the DNS request, the DNS module 208 may be configured to communicate with the name tree module 202 to obtain the network address that is associated with the unique ID included in the DNS request. In some example configurations, the network address may be obtained based on a comparison of the unique ID included in the DNS request with the unique IDs included in the database. If there is a match, then the DNS module 208 may select the network address associated with the unique ID in the database matching the unique ID included in the DNS request. The DNS module 208 may then generate a DNS response that includes the selected network address, and transmit the DNS response with the network interface module 204 over the network 110 to the electronic device having the source functional object. In some example configurations, the DNS response may include resource records. Upon receipt of the DNS response, the electronic device having the source functional object may be configured to extract the network address from a resource record included in the DNS response.

In alternative situations, the source functional object may know a class ID of a desired class of functional objects for which to send the information, but may not know the instance IDs of the functional objects belonging to the desired class, if any such functional objects are connected in the system 100. For these alternative situations, the DNS request may be a query for any or all functional objects of the desired class that are connected in the system 100. The DNS request may include the class ID of the desired class. Upon receipt of the DNS request, the DNS module 208 may be configured to communicate with the name tree module 202 to obtain all instance IDs and network addresses that are associated with the desired class ID identified in the DNS request. The DNS module 208 may then generate a DNS response that includes the obtained instance IDs and network addresses associated with the desired class ID over the network 110 to the electronic device having the source functional object.

In some example configurations, where multiple instance IDs and network addresses are returned, the electronic device that receives the DNS response may be configured to determine which of the plurality of functional objects to transmit the information. In some configurations, the electronic device may be configured to present a request for a user selection to a user of the system 100. The electronic device may further be configured to receive an input indicative of the user selection. Based on the received input, the electronic device may be configured to select the destination functional object. Alternatively, the electronic device may automatically determine which destination functional object to send the information without presenting a request for a user selection.

In some example configurations, the network manager 102 may be configured to communicate with functional objects implemented as FBlocks under MOST that may communicate over a MOST network 210. As shown in FIG. 2, the first and second electronic devices 104, 106 may each be configured to communicate over the MOST network 210 in addition to communicating over the network 110. To communicate over the MOST network 210, the network manager 102 may include a FBlock interface (I/F) module 212. The network manager 102 may further include a FBlock skeleton module 214 and a FBlock data module 216. The FBlock data module 216 may provide a database of values that are indicative of FBlock and/or MOST properties. The FBlock skeleton module 214 may be configured to get the values out of and/or set the values in the FBlock data module 216. Additionally, the FBlock skeleton module 214 may be configured to communicate with the name tree module 202 to obtain identification information and/or address information of the FBlocks in the network 100. The FBlock skeleton module 214 and the FBlock data module 216 may communicate with each other or otherwise operate in conjunction with each other to generate FBlock messages for transmission with the FBlock interface module 212 over the FBlock network 210.

In some example configurations, the name tree module 202, the FBlock skeleton module 214, and the FBlock data module 216 may all be included as part of a central registry 218.

FIGS. 1 and 2 show two electronic device 104 and 106 communicating with a network manager 102 over the network 110, although any number of electronic devices in the system 100 may communicate over the network 110 with the network manager 102. Additionally, the number of electronic devices in the system 100 may change. For example, the electronic devices 104, 106 may enter and leave the system 100 at various points in time. Additionally, more or fewer than the two electronic device 104, 106 may enter or leave the system 100 at various points in time.

Referring back to FIG. 1, the network manager 102 and the electronic devices 104, 106 may each include a processor P configured to perform the above described functions. The processor P may be a general processor, a digital signal processor, a controller, a microcontroller, an application specific integrated circuit, a field programmable gate array, an analog circuit, a digital circuit, combinations thereof, or other now known or later developed processors. The processor P may be a single device, a plurality of devices, or a combination of devices, such as associated with a network or distributed processing. Any of various processing strategies may be used, such as multi-processing, multi-tasking, parallel processing, remote processing, or the like. The processor P may be responsive to and/or configured to execute instructions stored as part of software, hardware, integrated circuits, firmware, micro-code, or the like.

In addition, the network manager 102 and the electronic devices 104, 106 may each include a memory M in communication with the processor P. The memory M may be non-transitory computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, and the like. The memory M may be a single device or a combination of devices. The memory M may be adjacent to, part of, networked with and/or remove from the processor. Logic encoded in one or more tangible media for execution is defined as the instructions that are executable by the programmed processor P and that are provided on the computer-readable storage media, memories, or a combination thereof.

The memory M may be a computer readable storage media having stored therein data representing instructions executable by the programmed processor P. The memory M may store instructions for the processor P. The processor P may be programmed with and execute the instructions. The functions, acts, methods, or tasks illustrated in the figures or described herein are performed by the programmed processor P executing the instructions stored in the memory M. The functions, acts, methods or tasks are independent of the particular type of instructions set, storage media, processor or processing strategy and may be performed by software, hardware, integrated circuits, firmware, micro-code, and the like, operating alone or in combination. The instructions are for implementing the processes, techniques, methods, or acts described herein.

Additionally, the network manager 102 and the electronic devices 104, 106 may each include one or more interfaces (I/F) in communication with the processor P and the memory M, and that may be used to communicate information with each other over the network 110. The interface I/F may be a network interface and/or implemented in hardware, such as a hard-wired or wireless network interface. The interface I/F may be a universal asynchronous receiver/transmitter (UART), a parallel digital interface, a software interface, Ethernet, or any combination of known or later developed software and hardware interfaces.

The modules as described above with reference to FIG. 2 may be implemented in hardware or a combination of hardware and software. In addition, the modules may be implemented using any of the above-described processor P, memory M, interface I/F, or combinations thereof. For example, the functions of the above-described modules may be performed by at least one processor P. In addition or alternatively, the modules may include data representing instructions that are stored in the memory M and executable by at least one processor P. Additionally, the interface modules may be implemented using one or more interfaces (I/F) as described with reference to FIG. 1. Various configurations are possible.

Figure 3:
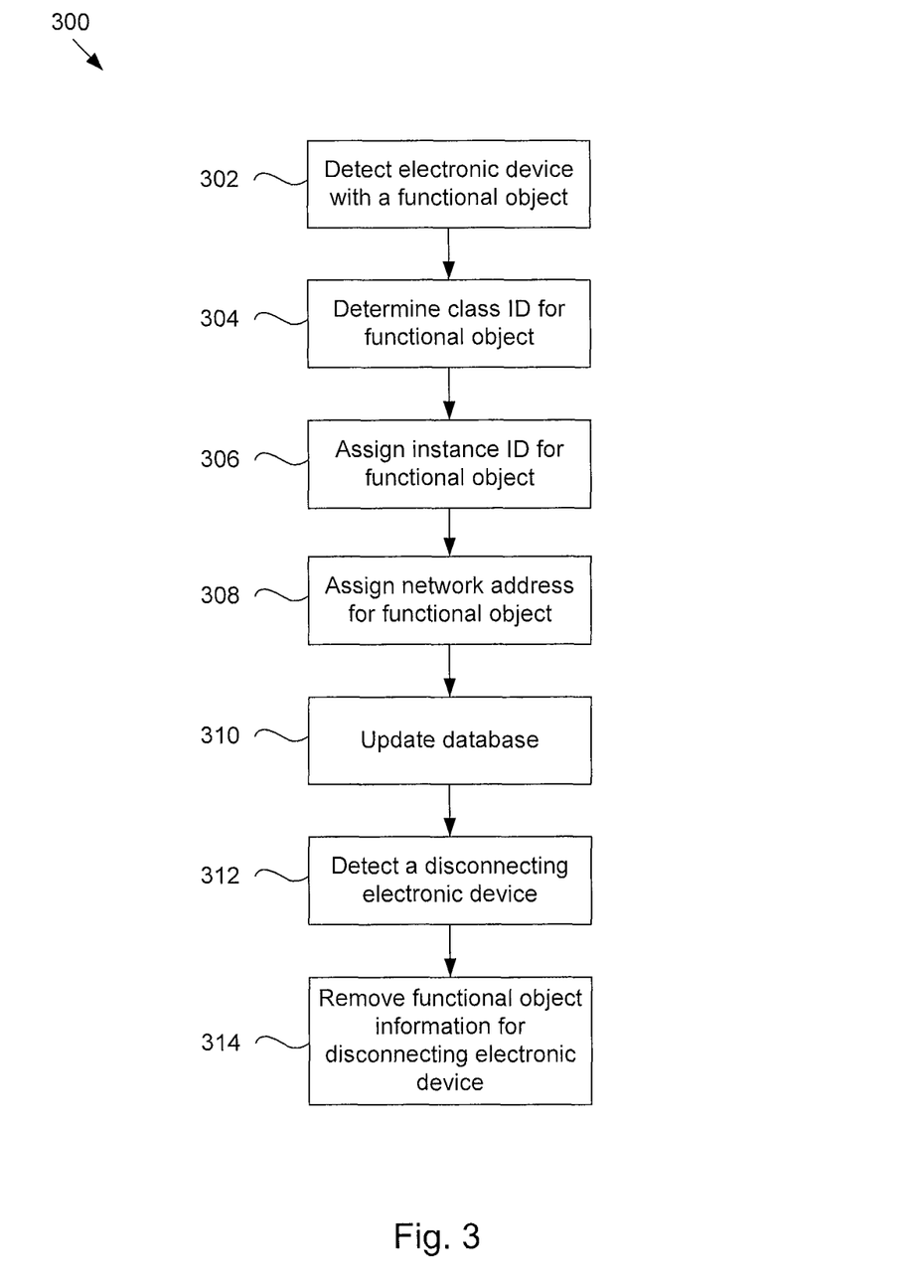
FIG. 3 is a flow diagram of an example method of managing unique IDs of functional objects and associated network addresses by a network manager in a communication system.

FIG. 3 shows a flow chart of an example method 300 of managing unique IDs of functional objects and associated network addresses by a network manager in a communication system. At block 302, the network manager may detect that an electronic device having one or more functional objects has connected to the system. The network manager may detect the electronic device has connected to the system in various ways. For example, upon connecting to the system, such as during a boot up process, the electronic device may transmit a DHCP message requesting instance IDs and network addresses for its functional objects. Alternatively, the network manager may transmit a broadcast message requesting identification from a electronic devices connected in the system.

At block 304, the network manager may determine class IDs for the functional objects of the detected electronic device. The class IDs may be included in the DHCP message received from the detected device. At block 306, the network manager may assign an instance ID for each of the functional objects. To do so, the network manager may access a database to determine whether there are other functional objects connected in the system with class IDs that match one or more of the class IDs of the detected electronic device. The database may include and/or provide a mapping between unique IDs (including class IDs and instance IDs) of functional objects in the system and associated network addresses. Based on the determination, the network manager may assign instance IDs to the functional objects of the detected device.

At block 308, the network manager may assign network addresses for the functional objects. The network manager may assign the network addresses through the use of a DHCP server that may maintain a database of available network addresses. At block 310, the network manager may update the database to include unique IDs of the functional objects of the detected device and the assigned network addresses for the functional objects. The unique IDs may include the class IDs included in the DHCP message and the assigned instance IDs.

At block 312, the network manager may detect that an electronic device is disconnecting from the system. At block 314, the network manager may remove the unique IDs and associated network addresses of the functional object of the disconnecting electronic device from the database.

Figure 4:
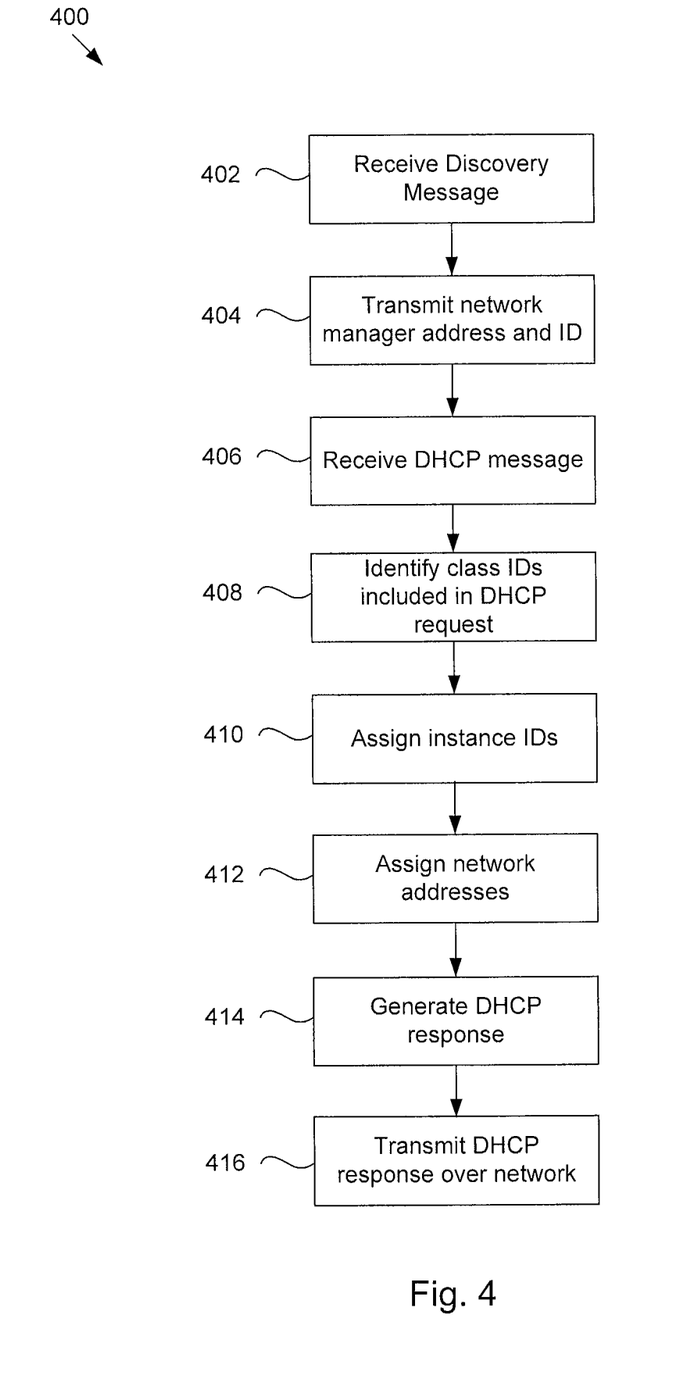
FIG. 4 is a flow diagram of an example method of providing identification information and network address information by a network manager to an electronic device in a network communication system.

FIG. 4 shows a flow chart of an example method 400 of providing identification information and network address information by a network manager to an electronic device in a network communication system. At block 402, the network manager may receive a discovery message over a network from an electronic device having one or more functional objects. The discovery message may be a request for a network address and/or identification information of the network manager. The electronic device may transmit the discovery message during or in response to a boot up process of the electronic device. At block 404, the network manager may transmit a response, which may include the network address and/or the identification information of the network manager.

At block 406, the network manager may receive a DHCP request from the electronic device. The DHCP request may be a request for instance IDs and network addresses for the functional objects. Additionally, the DHCP request may include class IDs associated with the functional objects of the electronic device. The electronic device may transmit the DHCP request to the network manager in response to the discovery message. Additionally, the DHCP request may be transmitted by the electronic device during or in response to a boot up process of the electronic device.

At block 408, the network manager may identify class IDs included in the DHCP request. At block 410, the network manager may assign an instance ID for each of the to functional objects. To do so, the network manager may access a database to determine whether there are other functional objects connected in the system with class IDs that match one or more of the class IDs included in the DHCP request. Based on the determination, the network manager may assign instance IDs to the functional objects included in the DHCP request.

At block 412, the network manager may assign network addresses for the functional objects included in the DHCP request. The network manager may assign the network addresses through the use of a DHCP server that may maintain a database of available network addresses. At block 414, the network manager may generate a DHCP response that includes the instance IDs and the network addresses for the functional objects identified in the DHCP request. At block 416, the network manager may transmit the DHCP response over the network to the electronic device that transmitted the DHCP request.

Figure 5:
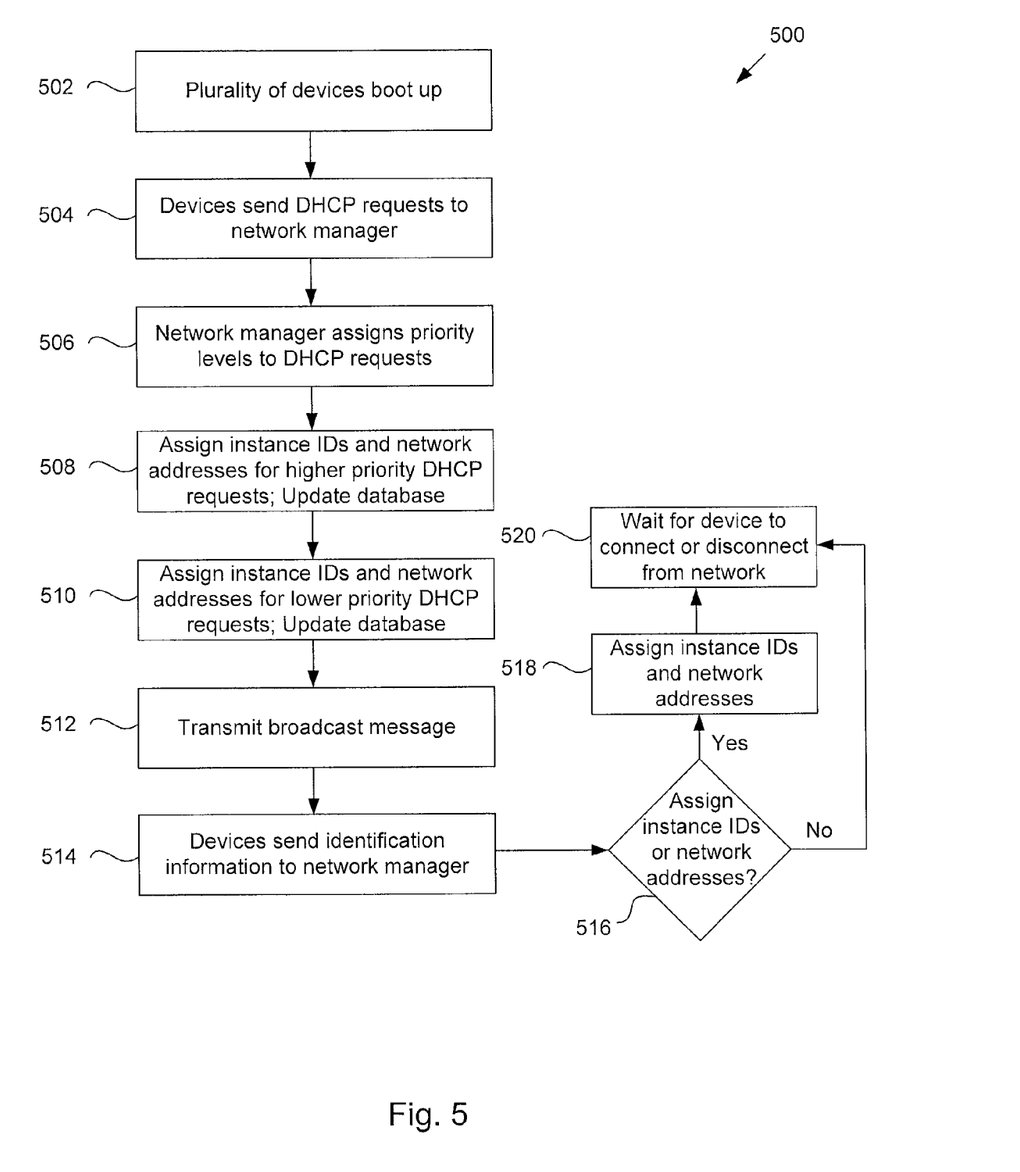
FIG. 5 is a flow diagram of an example method of providing identification information and network address information by a network manager to a plurality of electronic devices in a network communication system.

FIG. 5 shows a flow chart of an example method 500 of providing identification information and network address information by a network manager to a plurality of electronic devices in a network communication system. At block 502, the communication system may be activated and the plurality of electronic devices may each undergo a boot up process. At block 504, during or in response to the boot up processes, all or at least some of the electronic devices may send DHCP requests over a network to the network manager. The DHCP requests may be requests for instance IDs and network addresses for functional objects of the electronic devices.

At block 506, the network manager may receive the DHCP requests and assign a priority level to each of the DHCP requests. The priority levels may be assigned based on levels of importance of the functional objects, as identified by their class IDs included in the DHCP requests. At block 508, the network manager may assign instance IDs and network addresses for the functional objects identified in the DHCP requests that were assigned the higher priority. Also, at block 508, the network manager may update a database with the unique IDs and the associated network addresses for the functional objects included in the higher priority DHCP requests. At block 510, the network manager may assign instance IDs and network addresses for the functional objects identified in the DHCP requests that were assigned the lower priority. Also, at block 510, the network manager may update the database with the unique IDs and the associated to network addresses for the functional objects included in the higher priority DHCP requests.

At block 512, the network manager may transmit a broadcast message over the network to request the plurality of electronic devices to send their identification information to the network manager. The network manager may transmit the broadcast message to ensure that all of the DHCP requests are processed and that all of the electronic devices in the system receive instance IDs and network addresses from the network manager. At block 514, in response to the broadcast message, the electronic devices may send a message to the network with their identification information and/or assigned network addresses. Where an electronic device did not yet receive its instance IDs and/or network addresses, the electronic device may respond to the broadcast message by transmitting a DHCP request to the network manager.

At block 516, the network manager may receive the responses to the broadcast message, and based on the responses, may determine whether to assign instance IDs and/or network addresses for any functional objects. The network manager may make the determination by comparing the information received in the responses with information included in a database that maps unique IDs of functional objects and network addresses. In addition or alternatively, the network manager may make the determination by determining whether any of the received responses are DHCP requests for instance IDs and/or network responses.

If the network manager determines to assign more instance IDs and/or network addresses for functional objects, then the method may proceed to block 518, where the network manager assigns the instance IDs and/or the network addresses, and sends the information to the corresponding electronic device. After the instance IDs and the network addresses are sent, then at block 520, the network manager may wait for one or more electronic devices to connect or disconnect from the system and update the database accordingly. Referring back to block 516, if the network manager determines not to assign more instance IDs and/or network addresses for functional objects, then the method may proceed directly to block 520.

Figure 6:
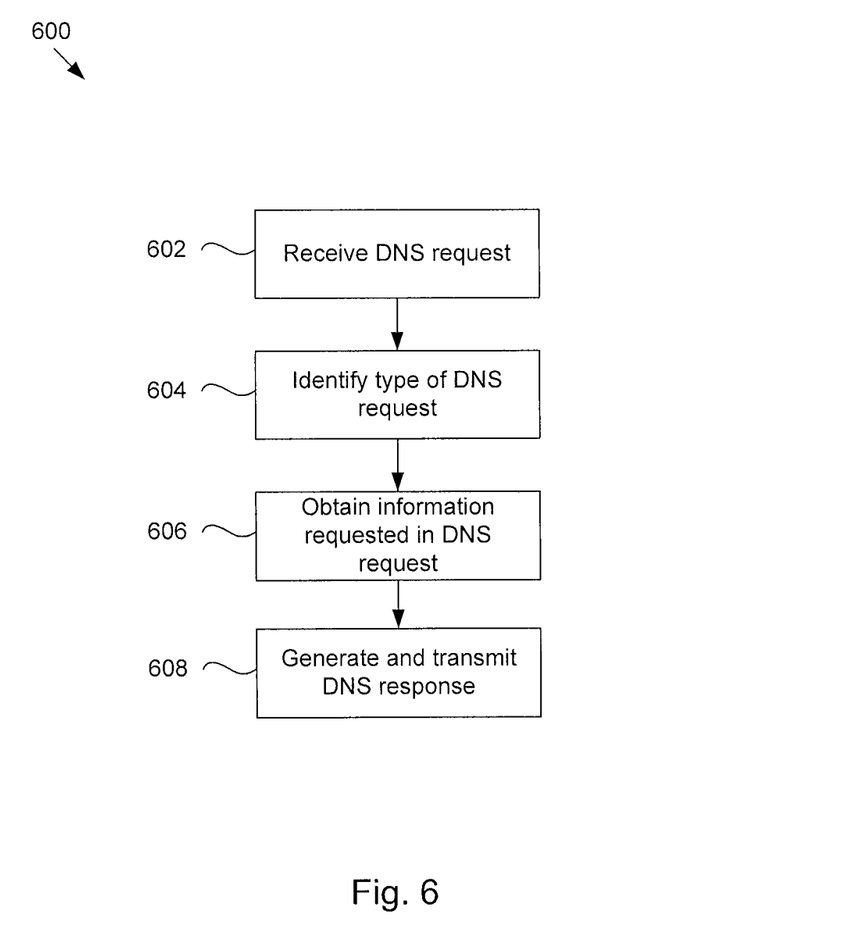
FIG. 6 is a flow diagram of an example method of providing identification information and network address information of a destination functional object to a source functional object by a network manager in a network communication system.

FIG. 6 shows a flow chart of an example method 600 of providing identification information and network address information of a destination functional object to a source functional object by a network manager in a network communication system. At block 602, the network manager may receive a DNS request from an electronic device having a source functional object that wants to transmit information over a network to a destination functional object. At block 604, the network manager may identify a type of the DNS request. In some situations, the DNS request may be a request for a destination network address of a specific functional object. The network manager may identify this type of DNS request by identifying that the DNS request includes a unique ID of a functional object. In alternative situations, the DNS request may be a query for all functional objects of a particular class. The network manager may identify this type of DNS request by identifying that the DNS request includes a class ID, without an associated instance ID to identify a particular functional object.

At block 606, the network manager may obtain the information requested in the DNS request by accessing a database that includes unique IDs of functional objects mapped to associated network addresses. If the DNS request is a request for a network address for a specified functional object, the network manager may identify the unique ID for the specified functional object in the database and obtain the network address associated with the unique ID. Alternatively, if the DNS request is a query for functional objects of a particular class, as indicated by a class ID in the DNS request, the network manager may identify in the database instance IDs for all or at least some of the functional objects belonging to the indicated class ID and network addresses associated with the instance IDs. At block 608, the network manager may generate a DNS response that includes the requested information and transmit the DNS response over the network to the electronic device that transmitted the DNS request.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A network manager configured to manage address resolution in a network communication system, the network manager comprising: a network interface in communication with a network; and a processor in communication with the network interface, the processor configured to: detect an electronic device connected in the network communication system, the electronic device comprising a first functional object that includes one or more of hardware and software that is operable to perform a function or service in the network communication system; responsive to detecting the electronic device connecting to the network: assign an instance identification (ID) uniquely identifying the first functional object within a class to which the first functional object belongs, each functional object belonging to the class being assigned a different instance identification from one another, and each class including one or more functional objects that perform the same function, and assign a network address for the first functional object; update a database to include the assigned instance ID mapped to the assigned network address for the first functional object; receive a request from a second functional object for identification information that identifies the first functional object for communication, the first functional object being a destination functional object and the second functional object being a source functional object for the communication; access the database to retrieve the instance ID mapped to the network address for the destination functional object; transmit the instance ID and the network address for the destination functional object to the source functional object; receive, via the network interface, a plurality of information requests, each of the plurality of information requests indicated one or more functional objects; and determine and assign an associated network address for each functional object indicated in each of the plurality of requests for information in an order determined by a priority of the plurality of requests.

2. The network manager of claim 1, where at least one of the plurality of information requests includes an information request received from the electronic device, the information request being a request for the instance ID and the network address for the first functional object, where the processor is configured to detect the electronic device based on receipt of the information request.

3. The network manager of claim 2, where the information request includes a class ID that identifies the class to which the first functional object belongs.

4. The network manager of claim 3, where the processor is further configured to:
determine a unique ID that uniquely identifies the first functional object in the network communication system and uniquely identifies the first functional object within the class, the unique ID being based on the class ID and the instance ID; and
map the unique ID to the network address in the database.

5. The network manager of claim 4, where the unique ID comprises a domain name system (DNS) name derived or converted from the class ID and the instance ID, and where two or more functional objects having the same class ID are included in different electronic devices having different network addresses.

6. The network manager of claim 2, where the information request comprises a Dynamic Host Configuration Protocol (DHCP) request, and where the processor is further configured to:
determine an available network address through access of a DHCP server; and
assign the available network address as the network address for the first functional object;
where the DHCP request is one of a plurality of DHCP requests, each DHCP request of the plurality of DHCP requests being associated with one or more different functional objects, where the processor is configured to determine and assign an associated network address for each functional object indicated in each of the plurality of DHCP requests in an order determined by a priority of the DHCP requests based on the class of each functional object indicated in each of the plurality of DHCP requests.

7. The network manager of claim 1, where the source functional object is included in a different electronic device with a different network address than the electronic device that includes the destination functional object.

8. The network manager of claim 1, where the request from the second functional object is a domain name system (DNS) request that includes a class ID identifying the class of functional objects to which the first functional object belongs, and where the DNS request comprises a query for instance IDs and associated network addresses for destination functional objects that belong to the class identified by the class.

9. The network manager of claim 8, wherein the processor is further configured to, in response to receiving the request from the second functional object, access the database to retrieve instance IDs mapped to network addresses for each destination functional object that belongs to the class identified by the class ID and transmit the retrieved instance IDs and network addresses for the destination functional objects that belong to the class identified by the class ID.

10. The network manager of claim 1, where the processor is further configured to:

transmit a broadcast message with the network interface over the network, where the processor is configured to detect the electronic device based on the transmission of the broadcast message.

11. The network manager of claim 1, where the processor is further configured to:

transmit a network address of the network manager with the network interface to the electronic device; and assign the instance ID and the network address for the first functional object after transmission of the network address of the network manager.

12. The network manager of claim 1, where the first functional object comprises an FBlock implemented in accordance with Media Oriented Systems Transport (MOST) communication specifications, where the network comprises an Audio-Video Bridging Network, and where the network address comprises an Internet Protocol (IP) address.

13. A method of managing network addresses in a network communication system, the method comprising: receiving, with at least one processor, an information request for identification information and network address information for a functional object of an electronic device in the network communication system, the functional object including one or more of hardware and software operable to perform a service or function in the network communication system, and the information request including a Dynamic Host Configuration Protocol (DHCP) request that is one of a plurality of DHCP requests; accessing, with the at least one processor, a database to determine a non-conflicting instance ID for the functional object, the non-conflicting instance ID uniquely identifying the functional object within a class to which the functional object belongs, each functional object belonging to the class being assigned a different instance identification from one another, and each class including one or more functional objects that perform the same function; assigning, with the at least one processor, a network address for each functional object indicated in each of the plurality of DHCP requests in an order determined by a priority of the DHCP requests; determining, with the at least one processor, a unique ID for the functional object based on the non-conflicting instance ID, the unique ID for the functional object being different from the network address for the functional object; and updating, with the at least one processor, the database to include each of the unique ID and the network address for the functional object.

14. The method of claim 13, further comprising:

identifying, with the at least one processor, a class ID included in the information request, the class ID identifying the class to which the functional object belongs; and determining, with the at least one processor, the non-conflicting instance ID based on the class ID in the information request and information accessed in the database.

15. The method of claim 13, wherein the information request comprises a first information request, and where the unique ID comprises a first unique ID, the method further comprising:

receiving, with the at least one processor, a second information request for a network address associated with a second unique ID identified in the second information request; and accessing, with the at least one processor, the database to determine the network address requested in the second information request.

16. The method of claim 13, where receiving the information request comprises:

receiving, with the at least one processor, the information request in response to a boot up process of the electronic device having the functional object.

17. One or more non-transitory computer readable storage media encoded with software comprising computer executable instructions, the computer executable instructions comprising: instructions executable to receive a first information request from a first electronic device in a network communication system, the first electronic device having a plurality of functional objects, each functional object of the first electronic device including one or more of hardware and software operable to perform a service or function in the network communication system, where the first information request comprises a Dynamic Host Configuration Protocol (DHCP) request that is one of a plurality of DHCP requests; instructions executable to, responsive to receipt of the first information request, assign an instance identification (ID) uniquely identifying at least a selected one of the functional objects within a class to which the at least one selected functional object belongs, and assign a network address for the at least one selected functional object, and to determine and assign an associated network address for each functional object indicated in each of the plurality of DHCP requests in an order determined by a priority of the DHCP requests; instructions executable to update a database that associates the instance ID with the network address for the at least one selected functional object; instructions executable to transmit an information response to the first electronic device that includes the instance ID and the network address for the at least one selected functional object; instructions executable to receive, from a second electronic device, a second information request that includes a selected class ID and a query for all functional objects of a selected class identified by the selected class ID that are connected to the network communication system, at least one functional object of the selected class being included in a different electronic device than one or more other functional objects of the selected class; and instructions executable to access the database and obtain each instance ID and/or network address for each functional object in the selected class identified by the selected class ID.

18. The one or more non-transitory computer readable storage media of claim 17, where the computer executable instructions further comprise:

instructions executable to assign a unique ID to the at least one selected functional object of the first electronic device, the unique ID based on the instance ID and a class ID that identifies the class to which the functional object belongs.

19. The one or more non-transitory computer readable storage media of claim 17, where the computer executable instructions further comprise:

instructions executable to receive a third information request for a destination network address associated with a destination functional object; and instructions executable to access the database to obtain the destination network address.

20. The one or more non-transitory computer readable storage media of claim 17, where the first information request comprises a Dynamic Host Configuration Protocol (DHCP) request, and where the computer executable instructions further comprise: instructions executable to determine one or more available network addresses through access of a DHCP server, where the network address for the at least one selected functional object is one of the one or more available network addresses, and where each DHCP request of the plurality of DHCP requests is associated with one or more different functional objects, where the priority of the DHCP requests being based on the class of each functional object indicated in each of the plurality of DHCP requests.

* * * * *